United States Patent
Hiyama et al.

(10) Patent No.: US 7,728,891 B2
(45) Date of Patent: Jun. 1, 2010

(54) IMAGE SENSOR

(75) Inventors: Hiroki Hiyama, Zama (JP); Hideaki Takada, Ebina (JP); Yuichiro Hatano, Yamato (JP); Yu Arishima, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 440 days.

(21) Appl. No.: 11/688,072

(22) Filed: Mar. 19, 2007

(65) Prior Publication Data
US 2007/0229687 A1 Oct. 4, 2007

(30) Foreign Application Priority Data
Mar. 31, 2006 (JP) ............... 2006-100397

(51) Int. Cl.
*H04N 5/335* (2006.01)
(52) U.S. Cl. ...................... 348/294; 348/308
(58) Field of Classification Search ............ 348/308
See application file for complete search history.

(56) References Cited

U.S. PATENT DOCUMENTS

| | | | | |
|---|---|---|---|---|
| 5,262,871 A | 11/1993 | Wilder et al. | ......... | 358/213.11 |
| 5,278,660 A | 1/1994 | Sugiki | ............... | 358/213.22 |
| 6,466,265 B1* | 10/2002 | Lee et al. | ............... | 348/308 |
| 6,480,227 B1* | 11/2002 | Yoneyama | ............... | 348/308 |
| 6,847,026 B2 | 1/2005 | Koizumi et al. | ......... | 250/208.1 |
| 6,888,568 B1 | 5/2005 | Neter | | |
| 6,963,371 B2 | 11/2005 | Sakurai et al. | ............... | 349/301 |
| 6,992,714 B1 | 1/2006 | Hashimoto et al. | ......... | 348/273 |
| 7,408,683 B2 | 8/2008 | Sato et al. | | |
| 2003/0011731 A1 | 1/2003 | Yoshida et al. | ............... | 349/117 |
| 2003/0020819 A1 | 1/2003 | Fukuda | ............... | 348/246 |
| 2003/0086005 A1 | 5/2003 | Nakamura | ............... | 348/223.1 |
| 2003/0141436 A1 | 7/2003 | Koizuma et al. | ......... | 250/208.1 |
| 2003/0206234 A1 | 11/2003 | Sakurai et al. | ............... | 348/301 |

(Continued)

FOREIGN PATENT DOCUMENTS

EP 0 967 795 A2 12/1999

(Continued)

OTHER PUBLICATIONS

May 9, 2008 Chinese Official Action in Chinese Patent Appln. No. 200710089818.5 (with translation).

*Primary Examiner*—Lin Ye
*Assistant Examiner*—Yih-Sien Kao
(74) *Attorney, Agent, or Firm*—Fitzpatrick, Cella, Harper & Scinto

(57) ABSTRACT

An image sensor includes a plurality of operation circuits. The operation circuit operates pixel signals read out from a group of pixels included in a readout area to generate a pixel signal in the thinning readout mode. A plurality of column selecting switches are arranged between the output terminals of the plurality of operation circuits and a plurality of output channels. A control circuit controls the plurality of column selecting switches such that pixel signals the number of which is equal to the number of the plurality of output channels are output to the plurality of output channels in parallel in the thinning readout mode. The circuit arrangements, each included in the corresponding one of the plurality of operation circuits and each viewed from the corresponding one of the column selecting switches used in the thinning readout mode, are equivalent to each other.

11 Claims, 12 Drawing Sheets

U.S. PATENT DOCUMENTS

| | | | |
|---|---|---|---|
| 2003/0227552 A1* | 12/2003 | Watanabe | 348/220.1 |
| 2005/0068434 A1 | 3/2005 | Hatano | 348/272 |
| 2005/0088535 A1 | 4/2005 | Hatano | 348/220.1 |
| 2005/0195307 A1 | 9/2005 | Sakurai et al. | 348/308 |
| 2005/0280730 A1* | 12/2005 | Lim et al. | 348/308 |
| 2006/0164527 A1 | 7/2006 | Wada et al. | 348/272 |
| 2007/0229686 A1 | 10/2007 | Hiyama et al. | 348/294 |
| 2007/0229687 A1 | 10/2007 | Hiyama et al. | 348/294 |
| 2008/0012976 A1 | 1/2008 | Sakurai et al. | 348/301 |

FOREIGN PATENT DOCUMENTS

| | | |
|---|---|---|
| JP | 4-137888 | 5/1992 |
| JP | 7-235655 | 9/1995 |
| JP | 2000-358250 | 12/2000 |
| JP | 2003-046876 | 2/2003 |
| JP | 2003-189183 | 7/2003 |
| JP | 2003-234964 | 8/2003 |
| JP | 2003-338988 | 11/2003 |
| JP | 2004-056424 A | 2/2004 |
| JP | 2004-180045 | 6/2004 |
| JP | 2005-109968 | 4/2005 |
| JP | 2005-130382 | 5/2005 |
| JP | 2005-286933 | 10/2005 |
| WO | 03/034714 A1 | 4/2003 |

* cited by examiner

IMAGE SENSOR

BACKGROUND OF THE INVENTION

1. Field of the Invention

The present invention relates to an image sensor.

2. Description of the Related Art

These days, image sensors for digital cameras make remarkable progress and are rapidly gaining a larger number of pixels for higher resolution of still images. Along with this, it is an urgent issue to increase the pixel signal readout speed in order to ensure sequential shooting performance necessary for a camera. Japanese Patent Laid-Open No. 2005-286933 discloses a CCD image sensor which parallely reads out pixel signals through a plurality of column shift registers to increase the readout speed.

A digital camera can capture still images and even moving images. The digital camera generally uses one image sensor to capture both still and moving images. The image sensor requires high resolution for still images, and requires a high frame rate for moving images while decreasing the resolution to match a general moving image standard. Japanese Patent Laid-Open No. 2005-130382 discloses an image sensor which adds pixel signals to decrease the resolution and increase the frame rate.

The CCD image sensor disclosed in Japanese Patent Laid-Open No. 2005-286933 parallely reads out pixel signals through a plurality of output column shift registers. Thus, the apparent signal readout speed is higher than in readout through a single output column shift register. However, Japanese Patent Laid-Open No. 2005-286933 does not describe any idea of increasing the frame rate used in capturing a moving image from that in capturing a still image.

The image sensor disclosed in Japanese Patent Laid-Open No. 2005-130382 adds pixel signals by merging charges on a horizontal output line. However, Japanese Patent Laid-Open No. 2005-130382 does not describe any concept of parallely outputting sums through a plurality of channels.

That is, Japanese Patent Laid-Open Nos. 2005-286933 and 2005-130382 do not have any idea of increasing the frame rate by parallely reading out low-resolution pixel signals through a plurality of channels in capturing a moving image.

Since the circuit arrangements for reading out pixels with a low resolution are arrayed periodically in the image sensor, the image sensor may output an image having periodical fixed pattern noise.

SUMMARY OF THE INVENTION

It is an object of the present invention to, e.g., improve the readout speed in a mode in which one pixel signal is read out from each target readout area and suppress production of periodical fixed pattern noise on an image to be output from an image sensor in this mode.

An image sensor according to the first aspect of the present invention has a plurality of pixels arranged such that a plurality of columns are formed and provides a first readout mode in which one pixel signal is read out from each readout area. The image sensor can comprise a plurality of readout circuits each configured to generate a pixel signal based on a signal provided by a pixel in a corresponding column, a plurality of operation circuits each configured to operate pixel signals read out from the pixels included in the corresponding readout area by the corresponding readout circuits to generate a pixel signal in the first readout mode, a plurality of output channels, a plurality of column selecting switches arranged between output terminals of the plurality of operation circuits and the plurality of output channels, and a control circuit configured to control the plurality of column selecting switches. The control circuit can control the plurality of column selecting switches such that pixel signals the number of which is equal to the number of the plurality of output channels are output to the plurality of output channels in parallel in the first readout mode. In this case, the circuit arrangements, each included in the corresponding one of the plurality of operation circuits and each viewed from the corresponding one of the column selecting switches used in the first readout mode, are equivalent to each other.

According to a preferred embodiment of the present invention, the image sensor can be configured to further provide a second readout mode in which pixel signals are read out from all the plurality of pixels. The plurality of operation circuits can output all the pixel signals generated by the plurality of readout circuits in the second readout mode. The control circuit can control the plurality of column selecting switches such that pixel signals the number of which is equal to the number of the plurality of output channels are output to the plurality of output channels in parallel in the second readout mode.

According to another preferred embodiment of the present invention, each of the plurality of operation circuits can calculate the average of the pixel signals read out from the pixels included in the corresponding readout area to generate a pixel signal in the first readout mode.

According to still another preferred embodiment of the present invention, each of the plurality of operation circuits can calculate the sum of the pixel signals read out from the pixels included in the corresponding readout area to generate a pixel signal in the first readout mode.

According to still another preferred embodiment of the present invention, each of the plurality of operation circuits can calculate, in accordance with the thinning mode, the average or sum of the pixel signals read out from the pixels included in the corresponding readout area to generate a pixel signal in the first readout mode.

According to still another preferred embodiment of the present invention, the plurality of operation circuits can have the same circuit arrangement. In this case, the column selecting switches used in the thinning readout mode can be column selecting switches which connect to the identical positions in the plurality of operation circuits.

According to still another preferred embodiment of the present invention, each of the operation circuits can include a plurality of capacitors configured to accumulate pixel signals provided by the readout circuits the number of which is equal to the number of columns in the corresponding readout area, and short switches configured to short-circuit the plurality of capacitors in the thinning readout mode.

The second aspect of the present invention relates to an image sensor which has a plurality of pixels arranged such that a plurality of columns are formed and which provides a first readout mode in which one pixel signal is read out from each readout area. The image sensor comprises a plurality of readout circuits each configured to generate a pixel signal based on a signal provided by a pixel in a corresponding column, a plurality of operation circuits each configured to operate pixel signals read out from the pixels included in the corresponding readout area by the corresponding readout circuits to generate a pixel signal in the first readout mode, a plurality of output channels, a plurality of column selecting switches arranged between output terminals of the plurality of operation circuits and the plurality of output channels, and a control circuit configured to control the plurality of column selecting switches. The control circuit can control the plurality of column selecting switches such that pixel signals the number of which is equal to the number of the plurality of output channels are output to the plurality of output channels in parallel in the first readout mode. The positions of column selecting switches, in a group of column selecting switches corresponding to the each readout area, which are used in the first readout mode are identical to each other in all the readout areas.

According to a preferred embodiment of the present invention, the image sensor can be configured to further provide a second readout mode in which pixel signals are read out from all the plurality of pixels. The plurality of operation circuits can output all the pixel signals generated by the plurality of readout circuits in the second readout mode. The control circuit can control the plurality of column selecting switches such that pixel signals the number of which is equal to the number of the plurality of output channels are output to the plurality of output channels in parallel in the second readout mode.

The third aspect of the present invention can be grasped as a camera comprising the above-described image sensor and a circuit configured to process signals output from a plurality of output channels of the image sensor.

According to the present invention, it is possible to, e.g., improve the readout speed in a mode in which one pixel signal is read out from each target readout area and suppress production of periodical fixed pattern noise on an image to be output from an image sensor in this mode.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will be described below with reference to the accompanying drawings.

First Embodiment

Figure 1:
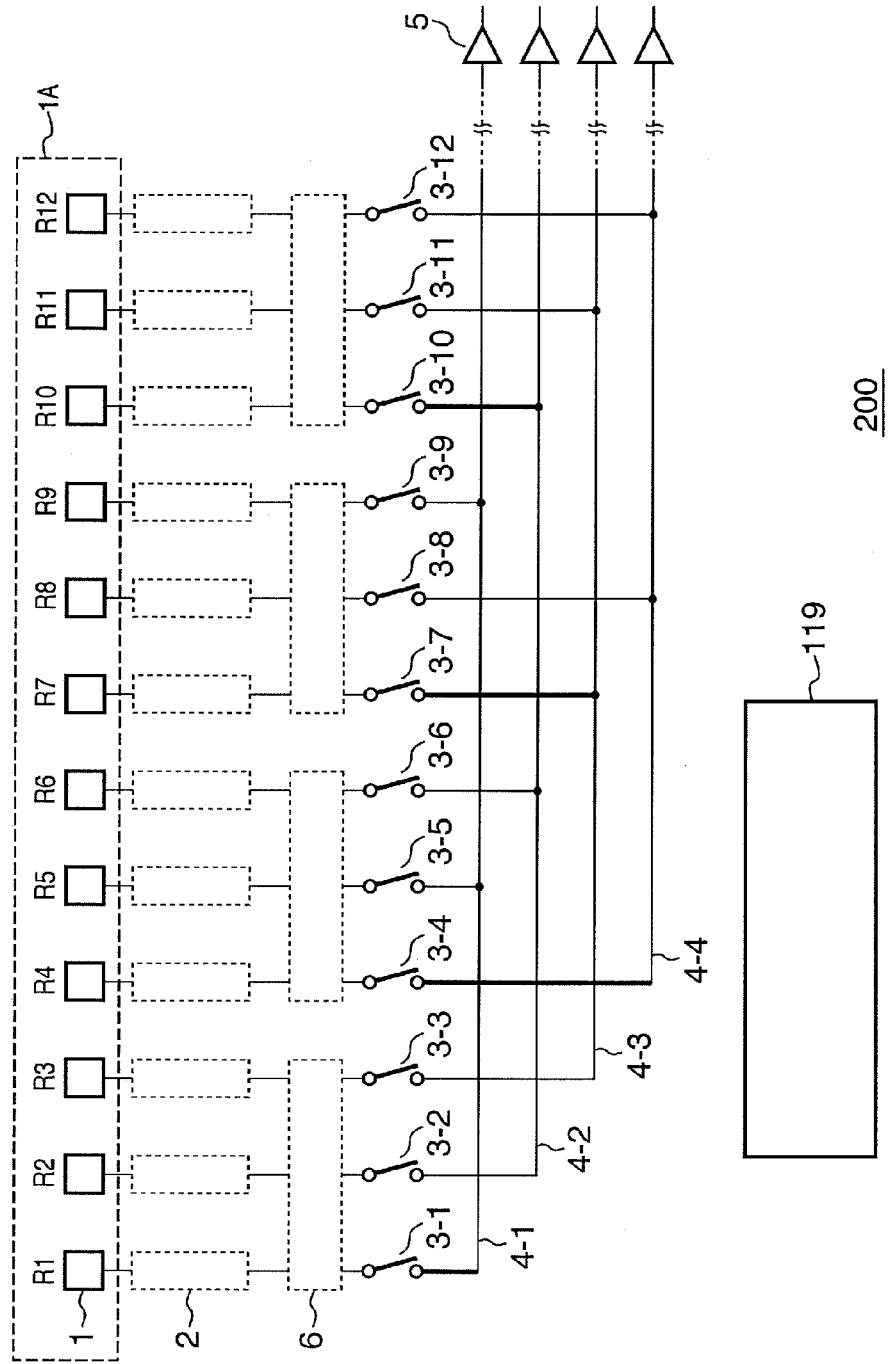
FIG. 1 is a circuit diagram showing the schematic arrangement of an image sensor according to the first embodiment of the present invention.

FIG. 1 is a circuit diagram showing the schematic arrangement of an image sensor according to the first embodiment of the present invention. An image sensor 200 provides a full pixel readout mode (second readout mode) in which the pixel signals of all pixels are read out, and a low resolution readout mode (first readout mode) in which one pixel signal is read out from each target readout area. The average readout mode will be exemplified below as the low resolution readout mode. The average readout mode here indicates a mode in which the average value of pixel signals of a plurality of pixels included in a target readout area is read out.

The image sensor 200 comprises a pixel array area 1A where a plurality of pixels 1 is arrayed. In the pixel array area 1A, the pixels 1 can be arranged to form a plurality of columns or one or a plurality of rows. FIG. 1 shows only pixels R1 to R12 of one row corresponding to a red filter. Each readout circuit 2 generates a pixel signal based on a signal supplied from a corresponding pixel. The readout circuit 2 supplies a pixel signal to the input terminal of a corresponding column selecting switch 3. The readout circuit 2 may incorporate an amplifier circuit and the like, or may be formed from only a conductive line for transmitting a pixel signal.

In the full pixel readout mode, an averaging circuit (operation circuit) 6 supplies a pixel signal, which is provided by each readout circuit 2, to a corresponding one of the column selecting switches 3, i.e., 3-1, 3-2, 3-3, 3-4, . . . that exists in the same column as the readout circuit 2. In the average readout mode as one of the low resolution readout modes, the averaging circuit 6 calculates, in accordance with an activation signal, the average value of a plurality of pixel signals provided by the plurality of readout circuits 2 which connect to the averaging circuit 6. In the average readout mode, to read out one averaged pixel signal from a target readout area containing a plurality of pixels, the averaging circuit 6 calculates the average value of pixel signals of the plurality of pixels belonging to the target readout area.

The input terminals of the plurality of column selecting switches 3, i.e., 3-1, 3-2, 3-3, 3-4, . . . connect to the averaging circuits 6, while the output terminals of the plurality of column selecting switches 3, i.e., 3-1, 3-2, 3-3, 3-4, . . . connect to horizontal output lines (output channels) 4, i.e., 4-1, 4-2, 4-3, and 4-4. In the full pixel readout mode, a horizontal scanning circuit (control circuit) 119 controls the plurality of column selecting switches 3 such that pixel signals the number of which is equal to the number of horizontal output lines 4 are output to the horizontal output lines 4. In the first embodiment, the number of horizontal output lines 4-1, 4-2, 4-3, and 4-4 is equal to that of output channels.

In the average readout mode, the horizontal scanning circuit 119 controls the plurality of column selecting switches 3 such that pixel signals the number of which is equal to that of horizontal output lines 4 are output to the horizontal output lines 4 in parallel. The circuit arrangements, within the averaging circuits 6, which are viewed from the column selecting switches used in the low resolution readout mode (circuit elements, within the averaging circuits 6, which are connected to the input terminals of the column selecting switches) are equivalent to each other.

One column selecting switch is used for each target readout area in the low resolution readout mode. In the first embodiment shown in FIG. 1, each target readout area contains three pixels or forms three columns, and one column selecting switch per three columns is used (turned on) in the low resolution readout mode. In the first embodiment shown in FIG. 1, the column selecting switches 3-1, 3-4, 3-7, and 3-10 are used in the low resolution readout mode. The circuit arrangements, within the averaging circuits 6, which are viewed from the column selecting switches 3-1, 3-4, 3-7, and 3-10 (circuit elements connected to the nodes of the input terminals of the column selecting switches) are equivalent to each other. For example, when the plurality of averaging circuits 6 have the same circuit arrangement, the column selecting switches 3 which connect to the identical positions of the plurality of averaging circuits 6 are used in the low resolution readout mode. In this case, the same circuit arrangement can include a circuit arrangement with the same netlist, a circuit arrangement with the same equivalent circuits, and a circuit arrangement with the same layout. In the first embodiment shown in FIG. 1, the plurality of averaging circuits 6 have the same circuit arrangement, and the column selecting switches 3-1, 3-4, 3-7, and 3-10 which connect to the identical positions (leftmost positions) of the plurality of averaging circuits 6 are used in the low resolution readout mode.

In the first embodiment, the four horizontal output lines 4 are arranged to be able to parallely output four pixel signals. An output amplifier 5 connects to the output of the horizontal output line 4. The output amplifier 5 executes impedance transformation necessary for driving the output load.

Figure 2:
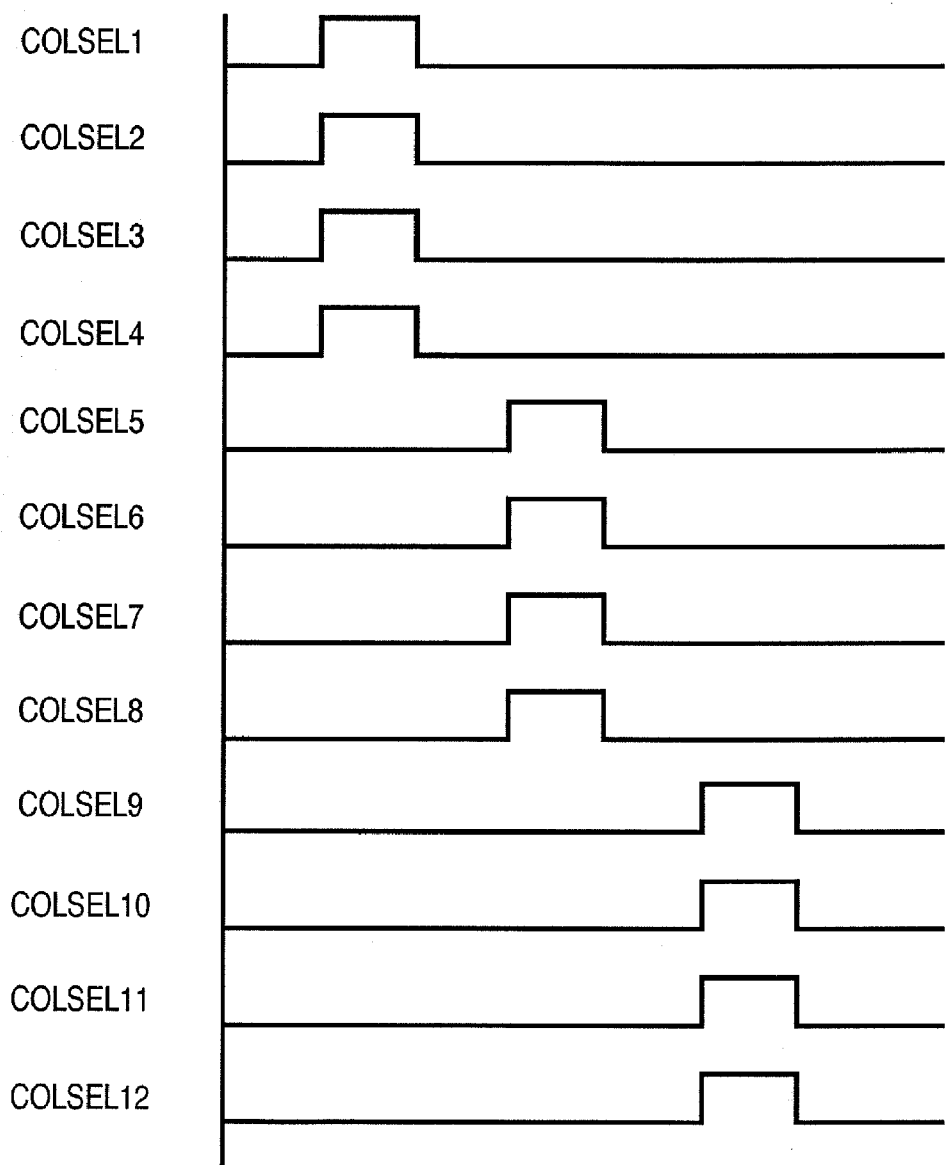
FIG. 2 is a driving timing chart of the full pixel readout mode in the image sensor according to the first embodiment of the present invention.

The operation of the image sensor 200 shown in FIG. 1 in the full pixel readout mode will be described with reference to the timing chart of FIG. 2. In FIG. 2, COLSELx represents a control signal (scan pulse signal) for controlling the column selecting switch 3-x. The control signal COLSELx changes to high level to turn on the column selecting switch 3-x, and to low level to turn it off. In this case, x means a column number. The horizontal scanning circuit (control circuit) 119 generates the control signal COLSELx.

First, the column selecting switches 3-1, 3-2, 3-3, and 3-4 are simultaneously turned on to output pixel signals, which are read out from the pixels R1, R2, R3, and R4 to the readout circuits 2, to the horizontal output lines 4-1, 4-2, 4-3, and 4-4. At this time, the pixel signals of the pixels R1, R2, R3, and R4 are output to the horizontal output lines 4-1, 4-2, 4-3, and 4-4 in accordance with the spatial arrangement order (order in a direction from the left to right) of the pixels. Then, the column selecting switches 3-5, 3-6, 3-7, and 3-8 are simultaneously turned on to output pixel signals, which are read out from the pixels R5, R6, R7, and R8 to the readout circuits 2, to the horizontal output lines 4-1, 4-2, 4-3, and 4-4. Subsequently, the column selecting switches 3-9, 3-10, 3-11, and 3-12 are simultaneously turned on. Pixel signals, which are read out from the pixels R9, R10, R11, and R12 to the readout circuits 2, are output to the horizontal output lines 4-1, 4-2, 4-3, and 4-4. By this step, the pixel signals of the 12 pixels are read out during a 3-clock period at a readout speed four times higher than the speed of readout from a single horizontal output line (requiring a 12-clock period).

Figure 3:
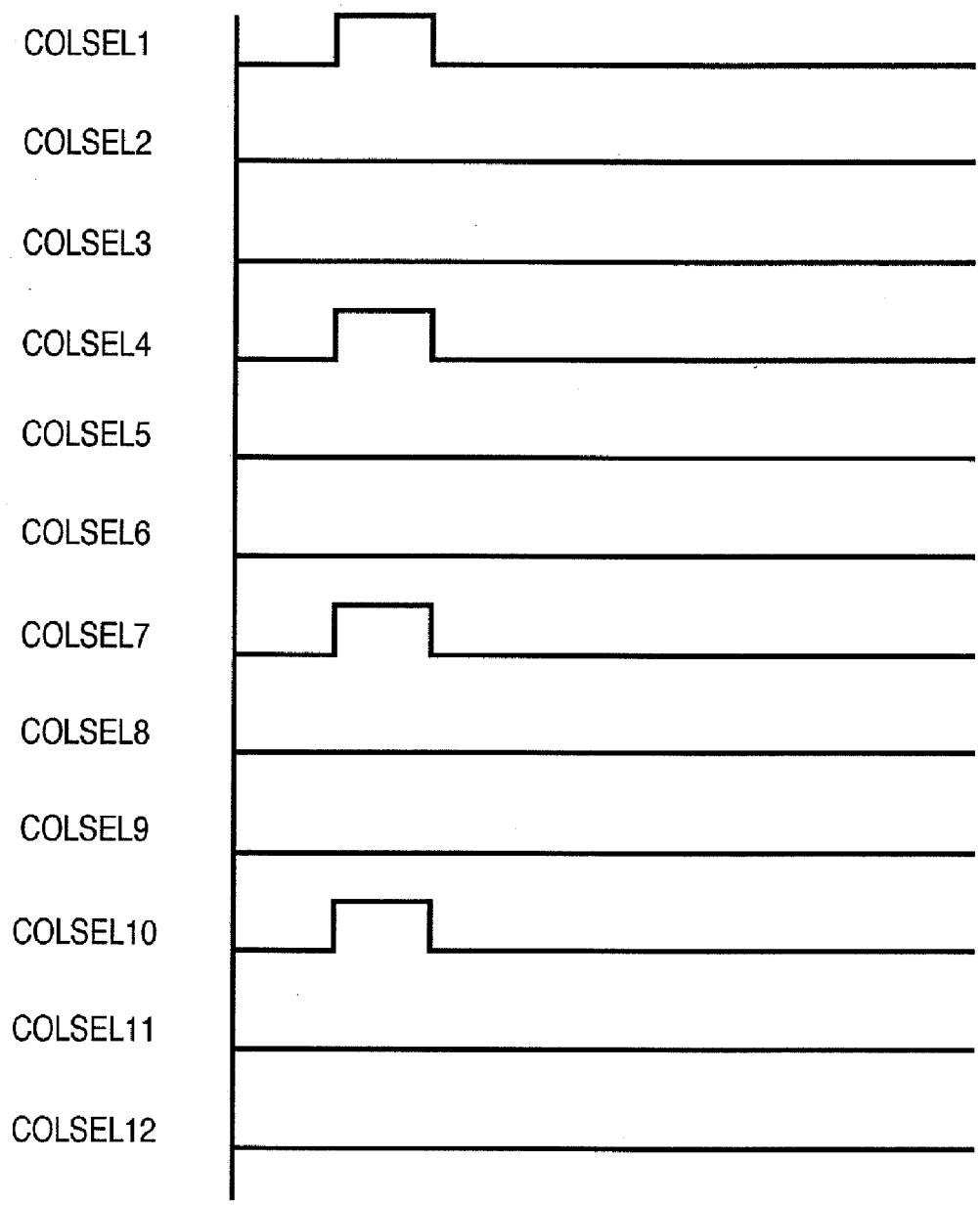
FIG. 3 is a driving timing chart of the average readout mode (thinning readout mode) in the image sensor according to the first embodiment of the present invention.

The operation of the image sensor 200 shown in FIG. 1 in the low resolution readout mode (average readout mode) will be described with reference to the timing chart of FIG. 3. An operation to read out one pixel signal from each target readout area of three pixels will be exemplified. The image sensor in the first embodiment parallely reads out the following four pixel signals.

More specifically, the average value of the pixel signals of the pixels R1, R2, and R3 which form the first target readout area (a group of pixels) is output as one pixel signal to the horizontal output line 4-1 via the column selecting switch 3-1. At the same time, the average value of the pixel signals of the pixels R4, R5, and R6 which form the second target readout area is output as one pixel signal to the horizontal output line 4-4 via the column selecting switch 3-4. Also at the same time, the average value of the pixel signals of the pixels R7, R8, and R9 which form the third target readout area is output as one pixel signal to the horizontal output line 4-3 via the column selecting switch 3-7. Also at the same time, the average value of the pixel signals of the pixels R10, R11, and R12 which form the fourth target readout area is output as one pixel signal to the horizontal output line 4-2 via the column selecting switch 3-10. As a result, the four averaged pixel signals are read out from the 12 pixel-containing area (four target readout areas) during 1-clock period, shortening the scan time to ⅓ of that in full pixel readout.

Figure 4:
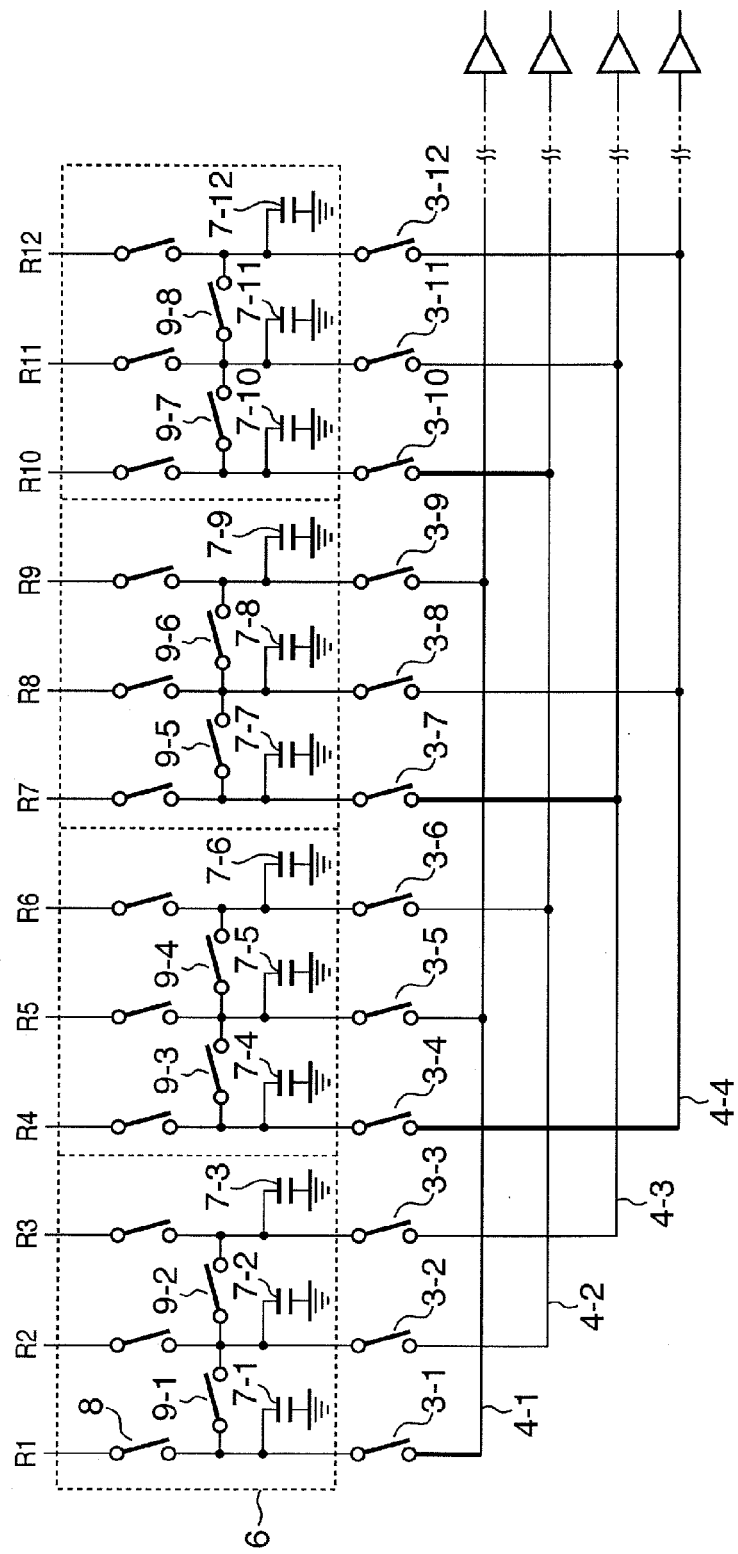
FIG. 4 is a circuit diagram showing a concrete example of the arrangement of the averaging circuit of the image sensor according to the first embodiment of the present invention.

FIG. 4 is a circuit diagram showing a concrete example of the arrangement of the averaging circuit in FIG. 1. Each averaging circuit 6 comprises capacitors 7-x corresponding to respective pixels, sample-and-hold switches 8 to sample and hold outputs from the respective pixels, and short switches 9, i.e., 9-1, 9-2, ... to short-circuit the capacitors 7-x.

Figure 5:
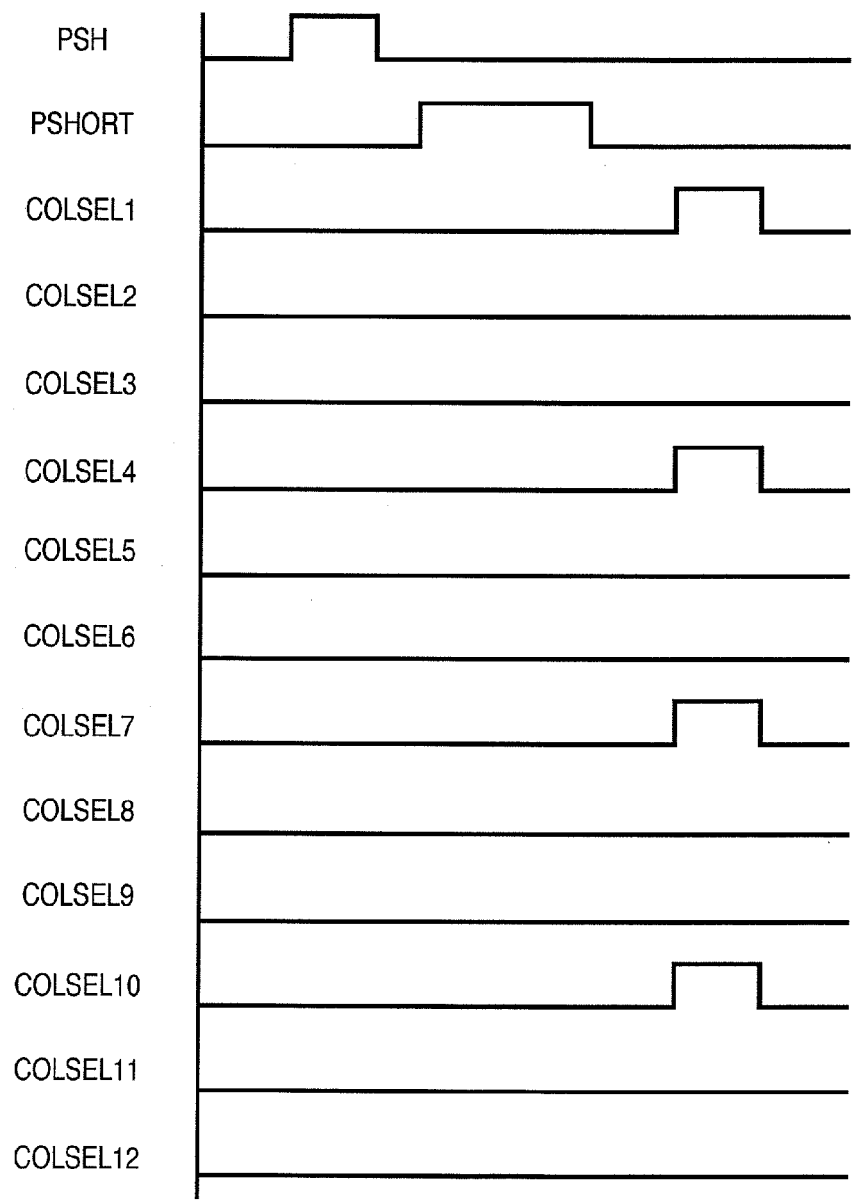
FIG. 5 is a driving timing chart of the average readout mode (thinning readout mode) in the image sensor according to the first embodiment of the present invention.

The averaging circuit 6 performs the averaging process as follows. FIG. 5 is a timing chart of the averaging process. PSH represents a common control signal supplied to the sample-and-hold switches 8. PSHORT represents a common control signal supplied to the short switches 9. The horizontal scanning circuit 119 generates the control signals PSH, PSHORT, and COLSELx.

First, the control signal PSH changes to high level (sample-and-hold pulse) for a predetermined period to turn on the sample-and-hold switches 8 and hold pixel signals of one row as charges in the capacitors 7 of respective columns. Then, the control signal PSHORT changes to high level to turn on the short switches 9 and merge pixel signals held by the capacitors 7-1, 7-2, and 7-3 through the short switches 9-1 and 9-2. This allows the signal electrodes of the capacitors 7-1, 7-2, and 7-3 to have the same potential, and the values of the pixel signals are averaged. Of the two electrodes of the capacitor, the signal electrode indicates one to/from which the signal is input/output.

Similarly, the pixel signals of the capacitors 7-4, 7-5, and 7-6, those of the capacitors 7-7, 7-8, and 7-9, and those of the capacitors 7-10, 7-11, and 7-12 are averaged.

The control signal PSHORT returns to low level to turn off the short switches 9-1, 9-2, ..., 9-8. At this time, the potentials held by the capacitors 7-1, 7-2, and 7-3 slightly change under the influence of, e.g., power OFF of the short switches 9-1 and 9-2. For example, when the short switch is a MOSFET, the potential held by the capacitor 7 changes through the parasitic capacitance between the gate and source (or gate and drain) of the MOSFET upon turning off the short switch 9. This phenomenon is generally called feedthrough. Letting $\Delta V$ be the change of the potential, held by the capacitor, due to feedthrough, the changes of the potentials of the capacitors 7-1 and 7-3 each of which connects to only one short switch are $\Delta V$. On the other hand, the change of the potential of the capacitor 7-2 which connects to two short switches 9 is $2 \times \Delta V$.

For this reason, the capacitors 7-1, 7-2, and 7-3 do not hold completely equal potentials after being cut off from each other when the control signal PSHORT changes to low level. If the circuit arrangements, within the operation circuits, which are viewed from the column selecting switches used in the low resolution readout mode are not equivalent to each other, the image sensor outputs an image having fixed pattern noise.

After the control signal PSHORT changes to low level, the column selecting switches 3-1, 3-4, 3-7, and 3-10 are turned on. The four average values are output to the horizontal output lines 4-1, 4-4, 4-3, and 4-2. In the first embodiment, the circuit arrangements, within the operation circuits 6, which are viewed from the column selecting switches 3-1, 3-4, 3-7, and 3-10 used in the low resolution readout mode are equivalent to each other. That is, in the first embodiment, the number of short switches 9 viewed from the input terminal of each of the column selecting switches 3-1, 3-4, 3-7, and 3-10 used in the low resolution readout mode is equal among them (one). According to the first embodiment, the signals from all the target readout areas change by the same amount due to feedthrough, resulting in no fixed pattern noise as described above. The circuit arrangement, within the operation circuit 6, which is viewed from the column selecting switch 3-1 includes the short switch 9-1, capacitor 7-1, and sample-and-hold switch 8. The circuit arrangement, within the operation circuit 6, which is viewed from the column selecting switch 3-4 includes the short switch 9-3, capacitor 7-4, and sample-and-hold switch 8. The circuit arrangement, within the operation circuit 6, which is viewed from the column selecting switch 3-7 includes the short switch 9-5, capacitor 7-7, and sample-and-hold switch 8. The circuit arrangement, within the operation circuit 6, which is viewed from the column selecting switch 3-10 includes the short switch 9-7, capacitor 7-10, and sample-and-hold switch 8.

A decrease in resolution accompanied by the averaging process contributes to an increase in S/N ratio. Many main noise components such as photoshot noise and thermal noise of a circuit have no correlation between pixels. Therefore, averaging the pixel signals of M pixels ideally increases the S/N ratio by $\sqrt{M}$.

The first embodiment averages the pixel signals of adjacent pixels which output pixel signals via different horizontal output lines in full pixel readout (high resolution readout). While parallel readout increases the frame rate in full pixel readout, the low resolution readout mode can prevent any unnatural image.

Instead of using the column selecting switches 3-1, 3-4, 3-7, and 3-10 to read out the pixel signals generated by averaging, the column selecting switches 3-2, 3-5, 3-8, and 3-11 may be used in readout. The column selecting switches 3-2, 3-5, 3-8, and 3-11 may alternatively be used in readout. In either case, the circuit arrangements, within the operation circuits 6, which are viewed from the column selecting switches used in the low resolution readout mode are equal to each other. This suppresses solid pattern noise due to, e.g., feedthrough.

The number of pixels which form each target readout area in the low resolution readout mode is not limited to three, and may be arbitrarily determined. The number of horizontal output lines or output channels may be arbitrarily determined as well.

Figure 6:
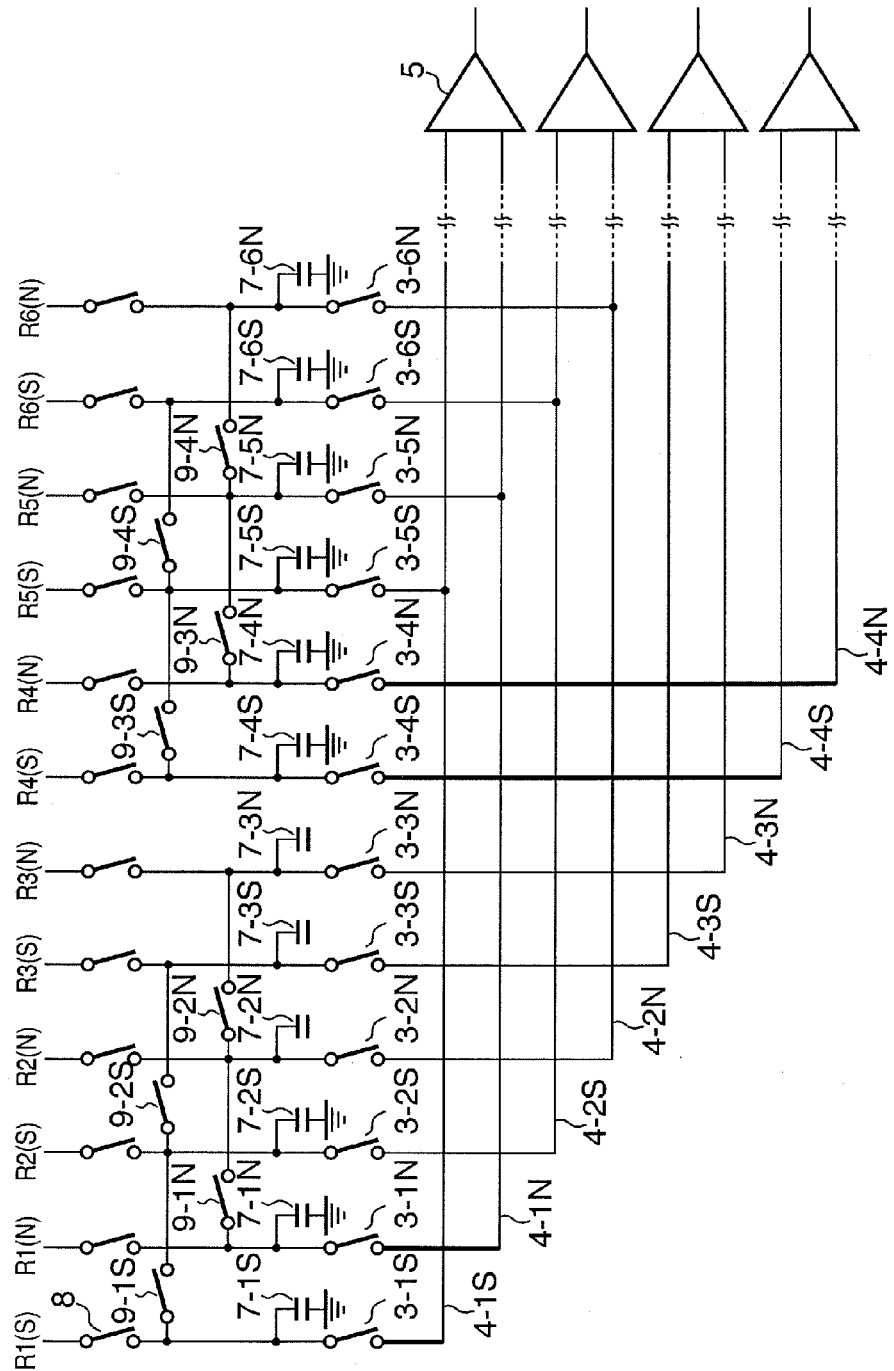
FIG. 6 is a circuit diagram showing a modification to the first embodiment shown in FIG. 4.

FIG. 6 is a circuit diagram showing a modification to the first embodiment shown in FIG. 4. A part shown in FIG. 6 corresponds to the first six pixels in FIG. 4. In the modification shown in FIG. 6, the capacitors 7-xN and 7-xS hold a pixel output (N output) in the reset state, and a valid pixel output, i.e., photocharge-equivalent output (S output). In this case, x represents a column in the pixel array area. For example, 7-1N and 7-1S mean capacitors for holding N and S outputs from a pixel on the first column.

The operation in the modification is the same as that in FIG. 4 except that a pair of differential outputs, i.e., N and S outputs form one output pixel signal (output channel). Forming an output pixel signal using differential outputs reduces common mode noise.

Averaged outputs are respectively output from the capacitors 7-1S/7-1N, 7-4S/7-4N, 7-7S/7-7N, and 7-10S/7-10N through the column selecting switches 3-1S/3-1N, 3-4S/3-4N, 3-7S/3-7N, and 3-10S/3-10N to four horizontal output line pairs (output channels) 4-1, 4-4, 4-3, and 4-2. In this case, 4-1N and 4-1S form the horizontal output line pair (output channel) 4-1, 4-2N and 4-2S form the horizontal output line pair (output channel) 4-2, 4-3N and 4-3S form the horizontal output line pair (output channel) 4-3, and 4-4N and 4-4S form the horizontal output line pair (output channel) 4-4.

According to this modification, it is possible to attain a high S/N ratio while increasing the frame rate by parallely reading out averaged pixel signals through a plurality of output channels and then differentially amplifying S outputs and N outputs. Also according to this modification, since the circuit arrangements, within the operation circuits 6, which are viewed from the column selecting switches used in the low resolution readout mode are equivalent to each other, fixed pattern noise due to, e.g., feedthrough is reduced.

Second Embodiment

Figure 7:
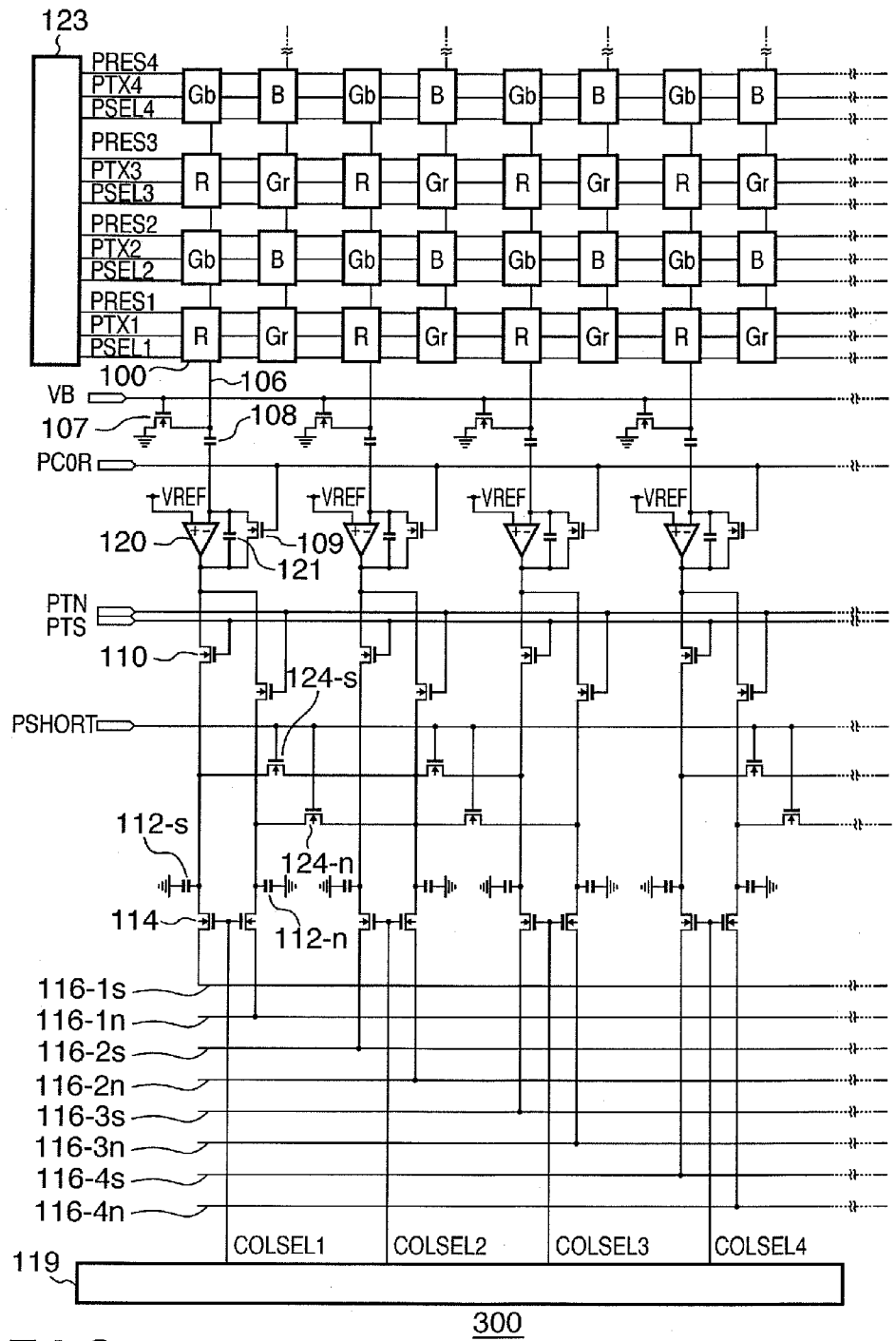
FIG. 7 is a circuit diagram showing the schematic arrangement of an image sensor according to the second embodiment of the present invention.

FIG. 7 is a circuit diagram showing the schematic arrangement of an image sensor according to the second embodiment of the present invention. Color filters R, Gr, Gb, and B in the Bayer array are formed on pixels 100, and an area sensor is built by two-dimensionally arraying picture elements each of 2×2 pixels.

Figure 8:
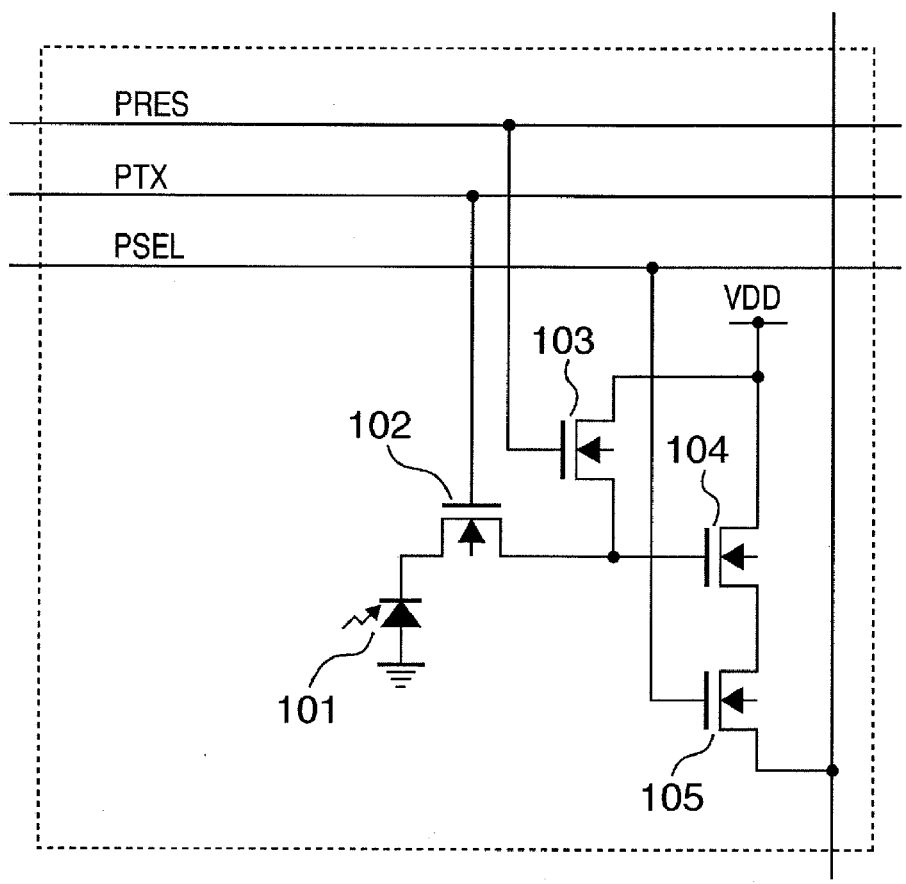
FIG. 8 is an equivalent circuit diagram of one pixel.

FIG. 8 is an equivalent circuit diagram of the pixel 100. A transfer pulse PTX, i.e., PTX1, PTX2, . . . controls a transfer switch 102. A reset pulse PRES, i.e., PRES1, PRES2, . . . controls a reset switch 103. A row selecting pulse PSEL, i.e., PSEL1, PSEL2, . . . controls a row selecting switch 105. A vertical scanning circuit 123 generates the transfer pulse PTX, reset pulse PRES, and row selecting pulse PSEL.

A full pixel readout operation in an image sensor 300 shown in FIG. 7 will be explained with reference to the timing chart of FIG. 9. The following description assumes that a set exposure time has elapsed and a photodiode 101 accumulates photocharges prior to the readout operation. A row on which R and Gr pixels are arranged side by side is selected. Signals from Gr pixels are read out by a circuit which is arranged at an upper portion in FIG. 7 and identical to an R pixel/Gb pixel readout circuit.

A process to read out pixel signals from R pixels will be explained as an example. First, the pixel reset pulse PRES changes from high level to low level to cancel reset of the gate electrode of an amplifier MOSFET 104. At this time, the capacitor (to be referred to as CFD hereinafter) in the floating diffusion layer connected to the gate electrode holds a voltage in the dark. Then, the row selecting pulse PSEL changes to high level, and an output in the dark appears on a vertical output line 106 due to a source follower circuit formed from the amplifier MOSFET 104 and a constant current source 107 in correspondence with the potential of the floating diffusion layer. At this time, an operational amplifier 120 operates as a voltage follower, and its output is almost equal to the reference voltage VREF. Upon the lapse of a predetermined time, a clamp pulse PC0R changes from high level to low level to clamp the output in the dark on the vertical output line 106. Subsequently, PTN changes to high level, and a holding capacitor 112*n* holds a signal in the dark (this signal is called the N output) containing the offset of the operational amplifier 120.

The transfer pulse PTX changes the transfer switch 102 to high level for a predetermined period to transfer photocharges accumulated in the photodiode 101 to the gate electrode of the amplifier MOSFET 104. At this time, transferred charges are electrons. Letting Q be the absolute value of the transferred charge amount, the gate potential decreases by Q/CFD. In correspondence with this, an output in the light appears on the vertical output line 106. Letting Gsf be the source follower gain, the change $\Delta Vvl$ of the potential Vvl of the vertical output line 106 from the output in the dark is given by $$\Delta Vvl = -Q/CFD \cdot Gsf \quad (1)$$

The potential change is amplified by an inverting amplifier circuit formed from the operational amplifier 120, a clamp capacitance 108, and a feed-back capacitance 121. An output Vct from the inverting amplifier circuit is given by $$Vct = VREF + Q/CFD \cdot Gsf \cdot C0/Cf \quad (2)$$

where C0 is the capacitance value of the clamp capacitance 108, and Cf is that of the feed-back capacitance 121. A holding capacitor 112*s* holds the output Vct (this signal is called the S output) while PTS is at high level.

Thereafter, column selecting switches 114 are sequentially selected by four at a time by scan pulses COLSEL1, COLSEL2, . . . generated by a horizontal scanning circuit (control circuit) 119. In response to this, signals held by the holding capacitors 112*s* and 112*n* are output to horizontal output lines 116-*ys* and 116-*yn* (y=1 to 4) via the column selecting switch 114. A pair of horizontal output lines for the S and N outputs forms one output channel. In the second embodiment, four horizontal output line pairs 116-1, 116-2, 116-3, and 116-4 are laid out. In this case, 116-1*s* and 116-1*n* form the horizontal output line pair (output channel) 116-1, 116-2*s* and 116-2*n* form the horizontal output line pair (output channel) 116-2, 116-3*s* and 116-3*n* form the horizontal output line pair (output channel) 116-3, and 116-4*s* and 116-4*n* form the horizontal output line pair (output channel) 116-4.

Figure 9:
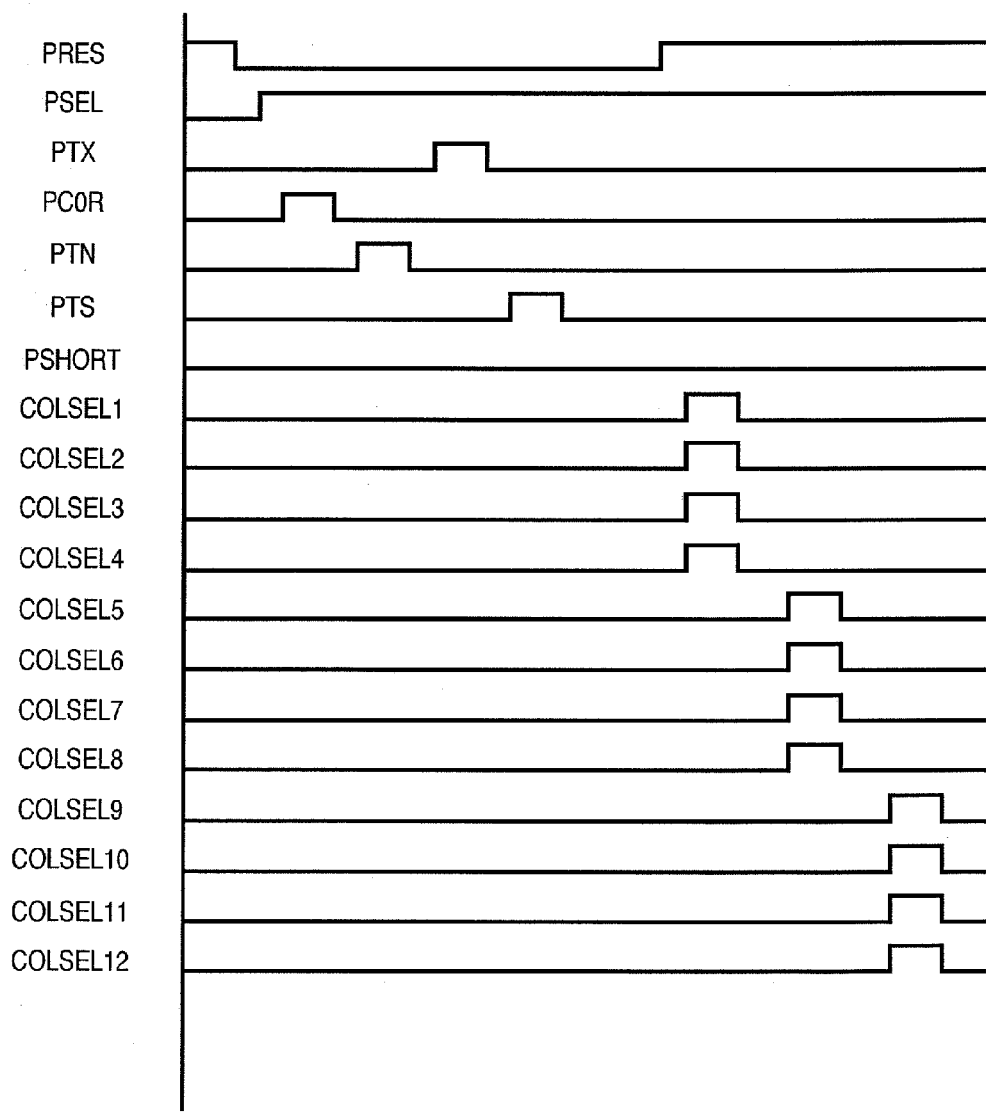
FIG. 9 is a driving timing chart of the full pixel readout mode in the image sensor according to the second embodiment of the present invention.
Figure 10:
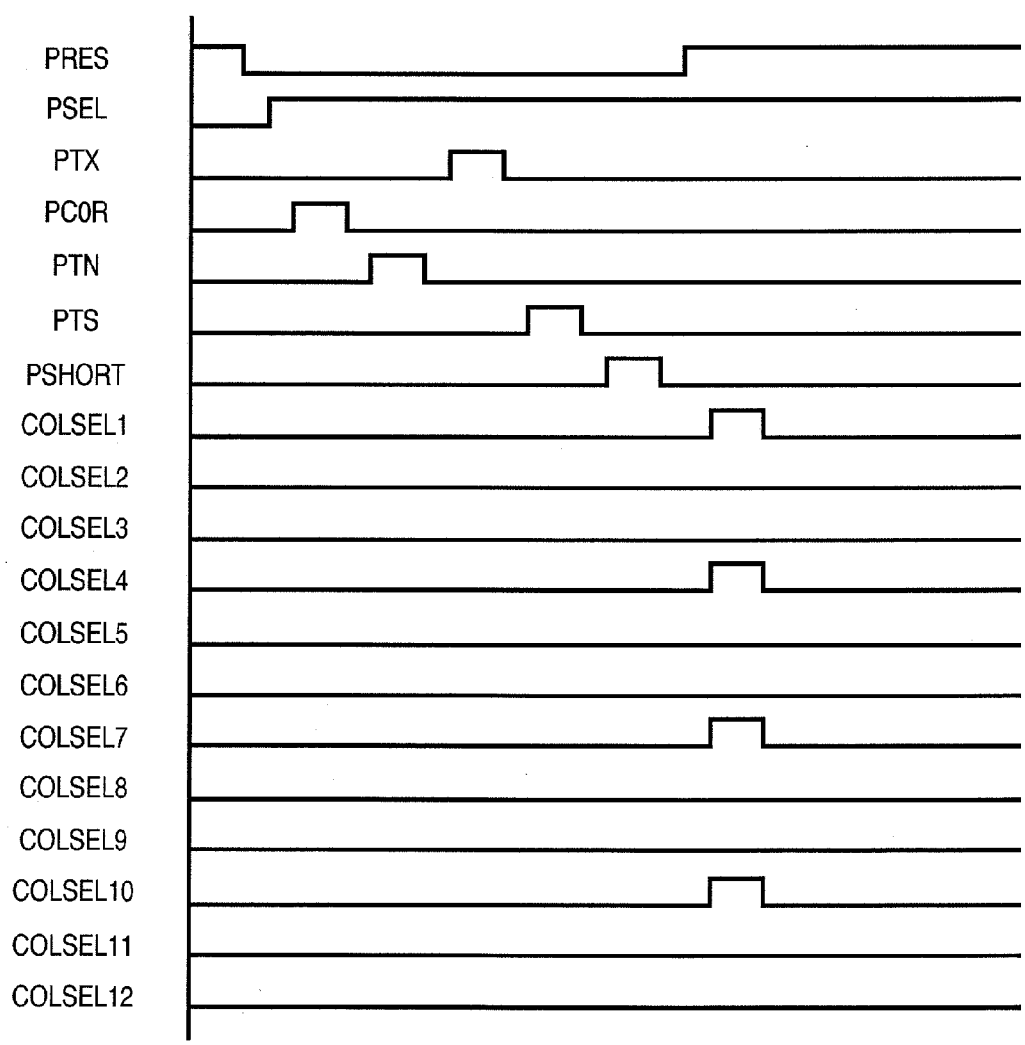
FIG. 10 is a driving timing chart of the average readout mode in the image sensor according to the second embodiment of the present invention.
Figure 11:
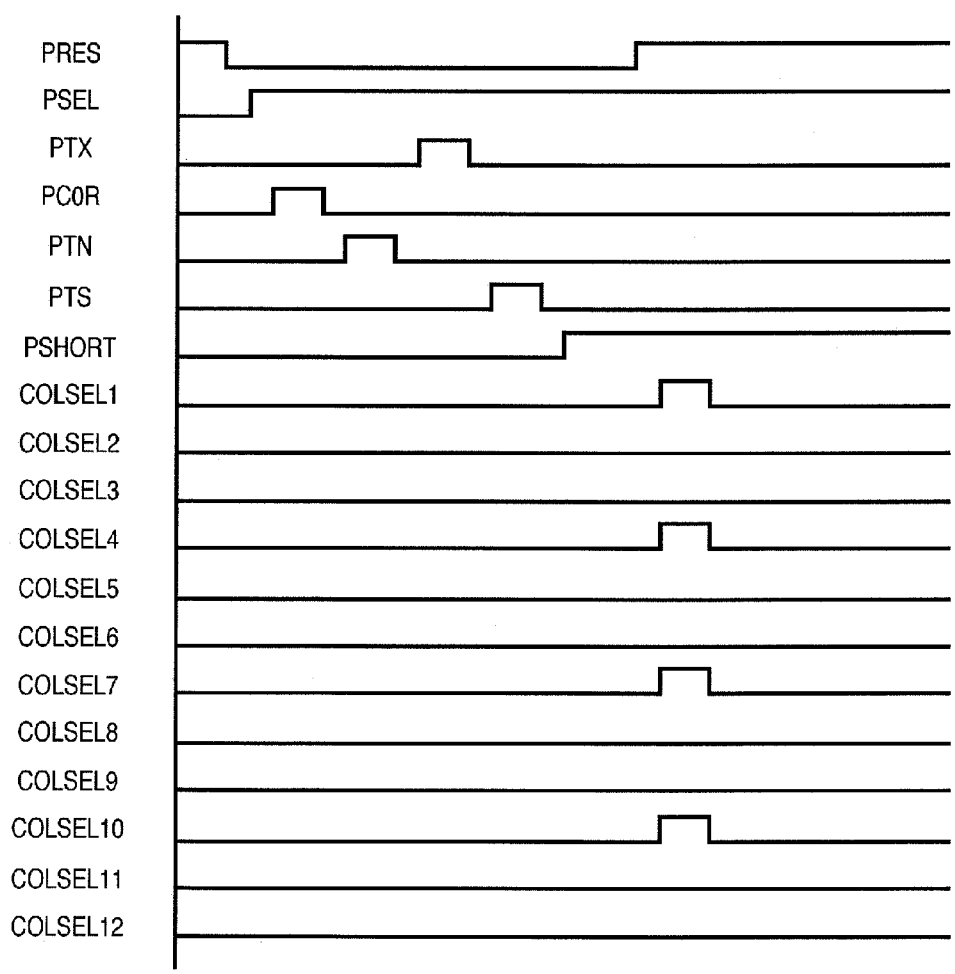
FIG. 11 is a driving timing chart of the additional readout mode in the image sensor according to the second embodiment of the present invention.

In full pixel readout, R pixel outputs from four pixels are parallely read out, as shown in FIG. 9. In FIG. 7, only the first four pixels are shown, and the remaining eight pixels are not illustrated. FIG. 10 is a timing chart of average readout from three pixels. FIG. 11 is a timing chart of additional readout from three pixels. As illustrated in the first embodiment, average readout from three pixels here exemplifies a decrease in resolution using, as one pixel signal, the average value of pixel signals read out from a target readout area containing a plurality of pixels. Additional readout from three pixels here exemplifies a decrease in resolution using, as one pixel signal, the sum of pixel signals read out from a target readout area containing a plurality of pixels. The resolution may decrease using a method of simply reading out one pixel from a plurality of pixels by thinning.

Similar to the first embodiment, PSHORT represents a control signal to control short switches 124-*s* and 124-*n*, and either the averaging process or add process is executable by switching timing control in the low resolution readout mode. In both the averaging process and add process, COLSEL1, COLSEL4, COLSEL7, and COLSEL10 are simultaneously turned on to output four R pixel signals (average outputs or added signals) to the four horizontal output line pairs 116-1 to 116-4. This means that pixels are read out from an area containing 12 R pixels because one pixel signal is obtained from three pixels by averaging or addition.

The image sensor according to the second embodiment can achieve a frame rate four times higher in full pixel readout and 12 times higher in low resolution readout (e.g., average readout or additional readout) than that in the case of reading out one color by one output channel. The image sensor can switch between average readout from three pixels and additional readout from three pixels by the PSHORT pattern in accordance with the low resolution readout mode. This switching can be done by controlling PSHORT by the horizontal scanning circuit 119 in accordance with a switching signal. Turning on the column selecting switch after changing PSHORT to low level allows average readout. Turning on the column selecting switch while maintaining PSHORT at high level allows additional readout.

A method of dividing pixels into blocks each of a plurality of pixel columns and reading out the pixels is available as a modification to the first and second embodiments. Block selecting switches are arranged for each block such that only a column selecting switch in a target readout area is made seen as a load from a horizontal output line. This reduces the parasitic capacitance of the horizontal output line. The cycle at which the block selecting switches are arranged is preferably a common multiple of the number N of output channels and the unit number M of thinned-out pixels.

Third Embodiment

Figure 12:
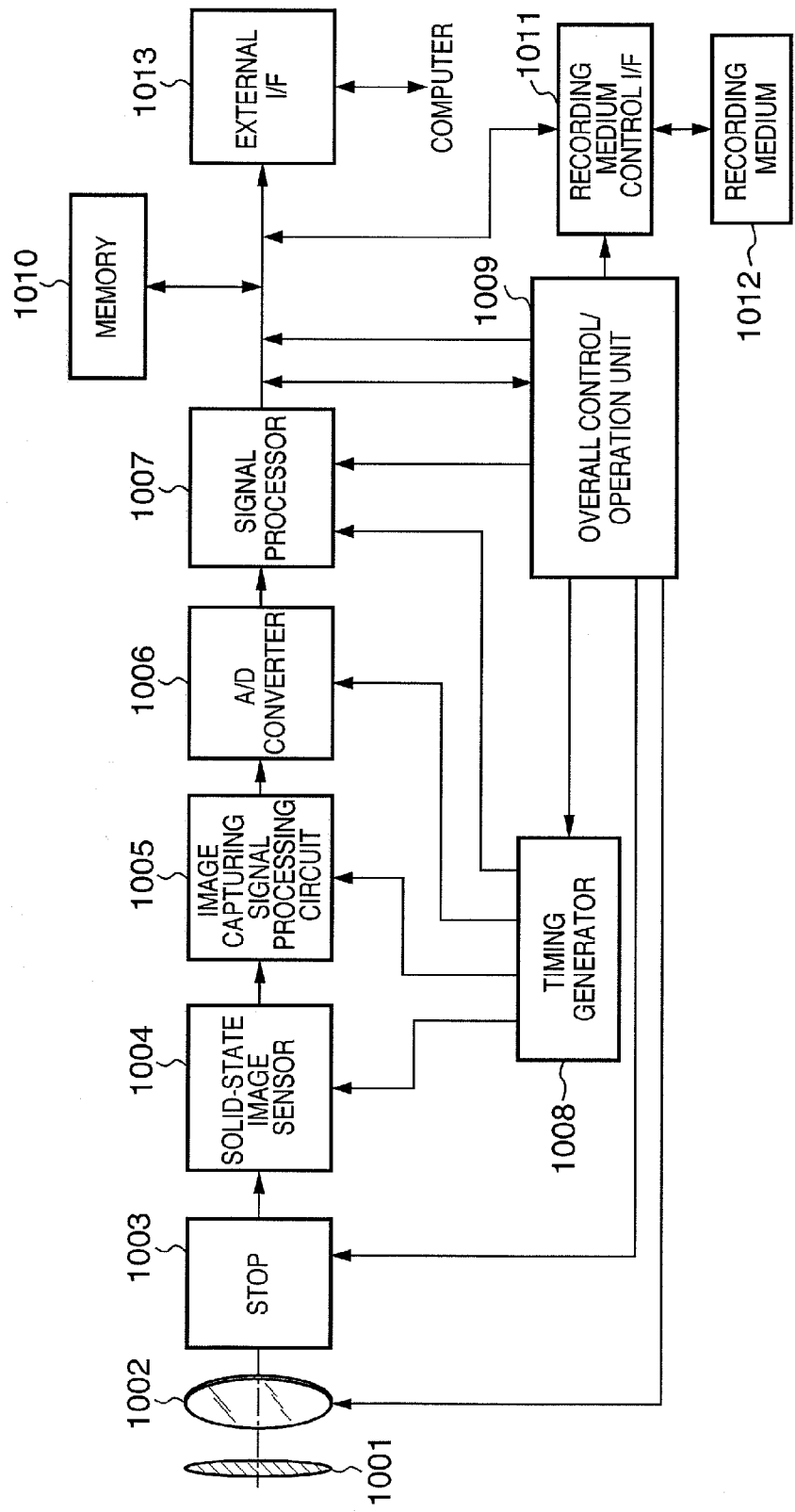
FIG. 12 is a block diagram showing the schematic arrangement of an image sensor according to a preferred embodiment of the present invention.

FIG. 12 is a block diagram showing the schematic arrangement of an image sensor according to a preferred embodiment of the present invention. A camera 400 comprises a solid-state image sensor 1004 exemplifying image sensors according to the first and second embodiments.

A lens 1002 forms an optical image of an object on the image capturing plane of the image sensor 1004. The outer surface of the lens 1002 is covered with a barrier 1001 which protects the lens 1002 and also serves as a main switch. The lens 1002 has a stop 1003 to adjust the quantity of light passing through the lens 1002. An image capturing signal processing circuit 1005 performs various processes such as correction and clamping for image capturing signals output from the image sensor 1004 through a plurality of channels. An A/D converter 1006 performs analog-to-digital conversion of image capturing signals output from the image capturing signal processing circuit 1005 through a plurality of channels. A signal processor 1007 performs various processes such as correction and data compression for image data output from the A/D converter 1006. The solid-state image sensor 1004, image capturing signal processing circuit 1005, A/D converter 1006, and signal processor 1007 operate in accordance with timing signals generated by a timing generator 1008.

The blocks 1005 to 1008 may be formed on the same chip as that of the solid-state image sensor 1004. An overall control/operation unit 1009 controls the blocks of the camera 400. The camera 400 comprises a memory 1010 for temporarily storing image data, and a recording medium control interface 1011 for recording/reading out an image on/from a recording medium. A recording medium 1012 includes a semiconductor memory and the like and is detachable. The camera 400 may comprise an external interface (I/F) 1013 for communicating with an external computer or the like.

The operation of the camera 400 shown in FIG. 12 will be described. In response to opening of the barrier 1001, the main power supply, the power supply of the control system, and the power supply of the image capturing circuit including the A/D converter 1006 are sequentially turned on. To control the exposure, the overall control/operation unit 1009 sets the stop 1003 to the full-aperture state. A signal output from the image sensor 1004 enters the A/D converter 1006 through the image capturing signal processing circuit 1005. The A/D converter 1006 A/D-converts the signal and outputs it to the signal processor 1007. The signal processor 1007 processes the data and supplies it to the overall control/operation unit 1009. The overall control/operation unit 1009 calculates and determines the exposure. The overall control/operation unit 1009 controls the stop on the basis of the determined exposure.

The overall control/operation unit 1009 extracts a high-frequency component from the signal which is output from the solid-state image sensor 1004 and processed by the signal processor 1007, and calculates the distance to the object on the basis of the high-frequency component. The overall control/operation unit 1009 drives the lens 1002 to determine whether the object is in focus. If the overall control/operation unit 1009 determines that the object is out of focus, it drives the lens 1002 again to measure the distance.

After confirming that the object is in focus, actual exposure starts. After the end of exposure, an image capturing signal output from the solid-state image sensor 1004 undergoes correction and the like by the image capturing signal processing circuit 1005, is A/D-converted by the A/D converter 1006, and is processed by the signal processor 1007. The image data processed by the signal processor 1007 is accumulated in the memory 1010 by the overall control/operation unit 1009.

The image data accumulated in the memory 1010 is recorded on the recording medium 1012 via the recording medium control I/F under the control of the overall control/operation unit 1009. The image data can be provided to a computer or the like via the external I/F 1013 and processed by it.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-100397, filed on Mar. 31, 2006, which is hereby incorporated by reference herein in its entirety.

What is claimed is:

1. An image sensor which has a plurality of pixels arranged such that a plurality of columns are formed and which provides a first readout mode in which one pixel signal is read out from each readout area including a plurality of pixels, the image sensor comprising:
    a plurality of readout circuits each configured to generate a pixel signal based on a signal provided by a pixel in a corresponding column;
    a plurality of operation circuits each configured to operate pixel signals read out from the pixels included in the corresponding readout area by the corresponding readout circuits to generate a pixel signal in the first readout mode;
    a plurality of output channels;
    a plurality of column selecting switches arranged between output terminals of the plurality of operation circuits and the plurality of output channels; and
    a control circuit configured to control the plurality of column selecting switches,
    wherein the control circuit controls the plurality of column selecting switches such that pixel signals the number of which is equal to the number of the plurality of output channels are output to the plurality of output channels in parallel in the first readout mode, and
    wherein the circuit arrangements, each included in the corresponding one of the plurality of operation circuits and each viewed from the corresponding one of the column selecting switches used in the first readout mode, are equivalent to each other.

2. The sensor according to claim 1, wherein the image sensor is configured to further provide a second readout mode in which pixel signals are read out from all the plurality of pixels,
    wherein the plurality of operation circuits output all the pixel signals generated by the plurality of readout circuits in the second readout mode, and
    wherein the control circuit controls the plurality of column selecting switches such that pixel signals the number of which is equal to the number of the plurality of output channels are output to the plurality of output channels in parallel in the second readout mode.

3. The sensor according to claim 1, wherein the plurality of operation circuits each calculate an average of the pixel signals read out from the pixels included in the corresponding readout area to generate a pixel signal in the first readout mode.

4. The sensor according to claim 1, wherein the plurality of operation circuits each calculate a sum of the pixel signals read out from the pixels included in the corresponding readout area to generate a pixel signal in the first readout mode.

5. The sensor according to claim 1, wherein the plurality of operation circuits each calculate, in accordance with a mode, an average or sum of the pixel signals read out from the pixels included in the corresponding readout area to generate a pixel signal in the first readout mode.

6. The sensor according claim 1, wherein the plurality of operation circuits have the same circuit arrangement, and the column selecting switches used in the first readout mode are column selecting switches which connect to identical positions in the plurality of operation circuits.

7. The sensor according to claim 1, wherein the operation circuits each include a plurality of capacitors configured to accumulate pixel signals provided by the readout circuits the number of which is equal to the number of columns in the corresponding readout area, and short switches configured to short-circuit the plurality of capacitors in the first readout mode.

8. An image sensor which has a plurality of pixels arranged such that a plurality of columns are formed and which provides a first readout mode in which one pixel signal is read out from each readout area including a plurality of pixels, the image sensor comprising:
    a plurality of readout circuits each configured to generate a pixel signal based on a signal provided by a pixel in a corresponding column;
    a plurality of operation circuits each configured to operate pixel signals read out from the pixels included in the corresponding readout area by the corresponding readout circuits to generate a pixel signal in the first readout mode;
    a plurality of output channels;
    a plurality of column selecting switches arranged between output terminals of the plurality of operation circuits and the plurality of output channels; and
    a control circuit configured to control the plurality of column selecting switches, wherein the control circuit controls the plurality of column selecting switches such that pixel signals the number of which is equal to the number of the plurality of output channels are output to the plurality of output channels in parallel in the first readout mode, and wherein positions of column selecting switches, in a group of column selecting switches corresponding to said each readout area, which are used in the first readout mode are identical to each other in all the readout areas.

9. The sensor according to claim 8, wherein the image sensor is configured to further provide a second readout mode in which pixel signals are read out from all the plurality of pixels, wherein the plurality of operation circuits output all the pixel signals generated by the plurality of readout circuits in the second readout mode, and wherein the control circuit controls the plurality of column selecting switches such that pixel signals the number of which is equal to the number of the plurality of output channels are output to the plurality of output channels in parallel in the second readout mode.

10. A camera comprising:

an image sensor defined in claim 1; and a circuit configured to process signals output from a plurality of output channels of the image sensor.

11. A camera comprising:

an image sensor defined in claim 8; and a circuit configured to process signals output from a plurality of output channels of the image sensor.

* * * * *